United States Patent
Park et al.

(10) Patent No.: US 11,913,413 B1
(45) Date of Patent: Feb. 27, 2024

(54) AIR INTAKE SYSTEM OF ENGINE

(71) Applicants: Hyundai Motor Company, Seoul (KR); Kia Corporation, Seoul (KR); FEV Europe GMBH, Aachen (DE)

(72) Inventors: Tae Won Park, Incheon (KR); Duk Jin Park, Seoul (KR); Kyung Sin Lee, Gyeonggi-do (KR); Alexander Reguschewski, Aachen (DE)

(73) Assignees: Hyundai Motor Company, Seoul (KR); Kia Corporation, Seoul (KR); FEV Europe GMBH, Aachen (DE)

( * ) Notice: Subject to any disclaimer, the term of this patent is extended or adjusted under 35 U.S.C. 154(b) by 0 days.

(21) Appl. No.: 18/205,631

(22) Filed: Jun. 5, 2023

(30) Foreign Application Priority Data

Nov. 25, 2022 (KR) .................. 10-2022-0160221

(51) Int. Cl.
*F02M 35/10* (2006.01)
*F01M 13/02* (2006.01)
*F01M 13/00* (2006.01)

(52) U.S. Cl.
CPC .. *F02M 35/10222* (2013.01); *F01M 13/0011* (2013.01); *F01M 13/0033* (2013.01); *F01M 13/028* (2013.01); *F02M 35/10157* (2013.01); *F02M 35/10255* (2013.01); *F01M 2013/0038* (2013.01)

(58) Field of Classification Search
CPC ........ F02M 35/10222; F02M 35/10157; F02B 37/162; F01M 13/028
See application file for complete search history.

(56) References Cited

U.S. PATENT DOCUMENTS

| | | | |
|---|---|---|---|
| 7,100,587 B2 * | 9/2006 | Ahlborn | F01M 13/021 123/572 |
| 7,523,748 B2 * | 4/2009 | Hirano | F01M 13/028 123/572 |
| 7,712,456 B2 * | 5/2010 | Hirano | F01M 13/021 123/572 |
| 9,593,605 B2 | 3/2017 | Ulrey et al. | |
| 10,337,398 B2 * | 7/2019 | Nonaka | F02B 37/007 |

FOREIGN PATENT DOCUMENTS

| | | |
|---|---|---|
| JP | 2009-174334 A | 8/2009 |
| JP | 2015-218654 A | 12/2015 |

* cited by examiner

*Primary Examiner* — Ngoc T Nguyen
(74) *Attorney, Agent, or Firm* — Fox Rothschild LLP

(57) ABSTRACT

Disclosed is a new air intake system of an engine including a blow-by gas flow line configured to allow blow-by gas to flow into an intake manifold by recirculating the blow-by gas using a pressure difference according to load of the engine, an intake gas supply line configured to allow intake gas to flow therethrough, the intake gas supply line including a throttle valve configured to control an amount of the intake gas and a turbocharger configured to compress the intake gas, a new air supply line branched from the intake gas supply line and connected to the crankcase, the new air supply line allowing new air to selectively flow into the crankcase, and a new air bypass line configured to allow, when a part of the intake gas is selectively bypassed by the pressure difference, the part of the intake gas to flow into the crankcase.

7 Claims, 2 Drawing Sheets

AIR INTAKE SYSTEM OF ENGINE

CROSS-REFERENCE TO RELATED APPLICATION

This application claims, under 35 U.S.C. § 119(a), the benefit of priority from Korean Patent Application No. 10-2022-0160221, filed on Nov. 25, 2022, the entire contents of which are incorporated herein by reference.

BACKGROUND

(a) Technical Field

The present disclosure relates to a new air intake system of an engine. More particularly, it relates to a new air intake system of an engine, configured to reduce oil sludge generation and to improve engine durability by enabling new air to be introduced into an engine boosting region.

(b) Background Art

In general, a turbo device of an engine rotates a turbine with pressure of exhaust gas discharged from the engine, and a compressor is driven by rotational force of the turbine to compress air suctioned into the engine, thereby increasing air intake efficiency of the engine and improving engine power.

Meanwhile, blow-by gas in the engine is unburned hydrocarbon leaked from a combustion chamber to a crankcase of the engine through a gap between a piston and a cylinder, and the same is normally supplied back to the combustion chamber to be burned again.

In a conventional turbo device, exhaust gas discharged from an engine is discharged after driving a turbine while passing through a turbocharger. Further, air suctioned into the engine is pressurized through a compressor driven by the turbine and then supplied to the engine. Further, the air pressurized by the compressor is cooled while passing through an intercooler before being supplied to the engine, and the cooled air is introduced into a combustion chamber in a state of increased density.

Meanwhile, blow-by gas in the liquid phase generated in the engine is introduced into the engine again through a check valve by a crankcase ventilation (CCV) apparatus, and new air is supplied to the front end of the compressor to be mixed with air suctioned into the engine. Then, the mixed air flows through a path leading to the combustion chamber of the engine.

However, when new air is supplied to the front end of the compressor, the new air is only introduced into the combustion chamber of the engine due to a pressure difference when a turbo is boosted, in other words, when the engine is fully loaded due to full acceleration. Accordingly, an intake amount of new air into the crankcase is significantly reduced, which results in a problem that durability of the engine deteriorates due to deterioration of oil in the crankcase and consequent generation of sludge.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to address the above-described problems associated with the prior art, and it is an object of the present disclosure to provide a new air intake system of an engine configured to, when an engine is boosted, open a throttle valve, operate a compressor of a turbocharger, and supply compressed intake gas including new air and blow-by gas to an intake manifold. Here, the new air intake system includes a bypass flow path configured to connect the rear end of an intake gas supply line to a crankcase. Further, when the engine is fully loaded, the bypass flow path bypasses intake air and allows the intake air to be selectively introduced into the crankcase, thereby making it possible not only to prevent deterioration of the engine but also to reduce consequent generation of oil sludge. In this manner, durability of the engine may be improved.

In one aspect, the present disclosure provides a new air intake system for use with an engine including a blow-by gas flow line configured to be formed on a head cover of an engine to allow blow-by gas introduced into a crankcase of the engine to be discharged from a combustion chamber of the engine, the blow-by gas flow line being configured to allow the blow-by gas to flow into an intake manifold of the engine by recirculating the blow-by gas by utilizing a pressure difference generated if the engine is loaded, an intake gas supply line configured to compress intake gas to be supplied to the combustion chamber and to allow the intake gas to flow therethrough, the intake gas supply line including: a throttle valve configured to control an intake amount of the intake gas to be supplied to the combustion chamber and a turbocharger configured to compress the intake gas, a new air supply line branched from the intake gas supply line and being connected to the crankcase, the new air supply line being configured to provide new air to pass through an air filter and be supplied to the intake gas supply line and selectively flow into the crankcase, and a new air bypass line bypassed on the intake gas supply line and being connected to the new air supply line. Wherein if the engine is loaded and the throttle valve is opened, a portion of the compressed intake gas comprising the new air is selectively bypassed due to the pressure difference, and wherein the new air bypass line is configured to allow the portion of the compressed intake gas to flow into the crankcase.

In a preferred embodiment, the blow-by gas flow line may include a partial load line configured to connect the head cover to a rear end of the intake gas supply line, the partial load line being formed to allow blow-by gas discharged from the head cover to flow into the intake manifold if the engine is partially loaded, and a full load line configured to connect the head cover to a front end of the intake gas supply line, the full load line being formed to allow blow-by gas discharged from the head cover to flow into the turbocharger if the engine is fully loaded.

In another preferred embodiment, the partial load line may include a pressure control valve (PCV) configured to selectively control opening and closing thereof if the engine is partially loaded and a pressure difference between the head cover and the rear end of the intake gas supply line is generated.

In still another preferred embodiment, the new air bypass line may include a flow rate control valve configured to selectively control opening and closing thereof if the engine is fully loaded and a pressure difference between a rear end of the intake gas supply line and the crankcase is generated.

In yet another preferred embodiment, the new air bypass line may be connected to a front end of a check valve configured to allow the new air to flow in one direction in the new air supply line.

Other aspects and preferred embodiments of the disclosure are discussed infra.

It is understood that the terms "vehicle", "vehicular", and other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, vehicles powered by both gasoline and electricity.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
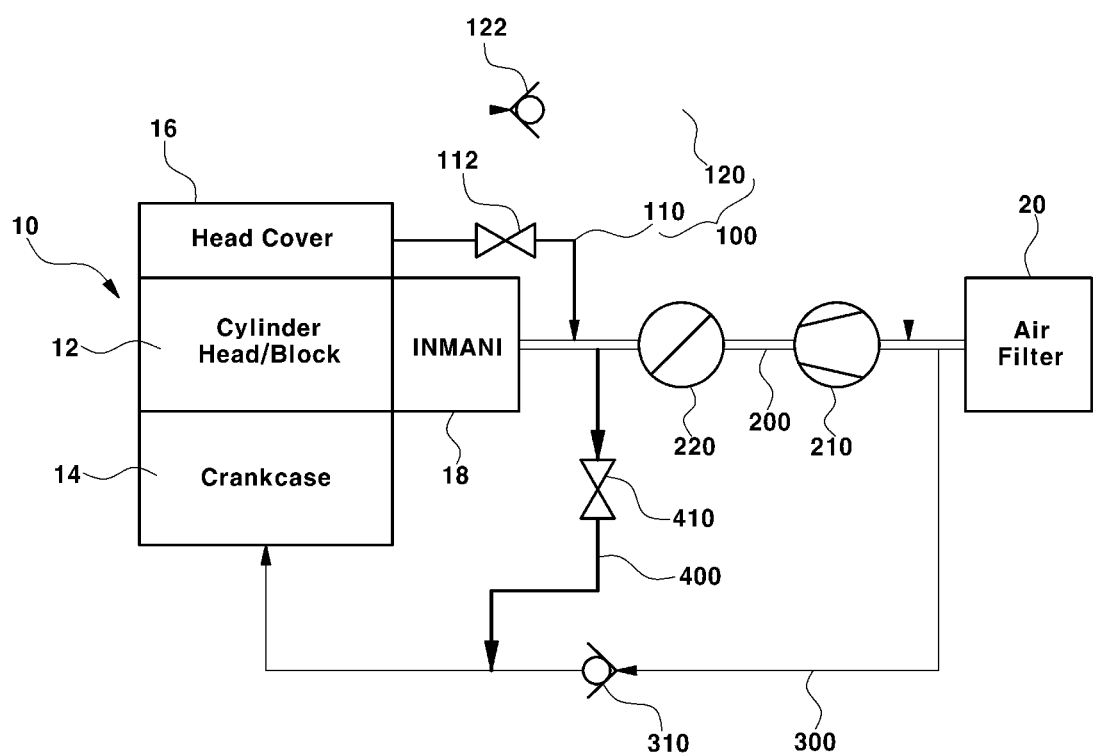
FIG. 1 is a diagram schematically showing a new air intake system of an engine according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below.

Advantages and features of the present disclosure and methods of achieving the same will become apparent with reference to the embodiments described below in detail in conjunction with the accompanying drawings.

However, the disclosure is intended to cover not only the embodiments described below, but also various alternatives, modifications, equivalents, and other embodiments, which may be included within the spirit and scope of the disclosure as defined by the appended claims. The embodiments are provided to complete the disclosure of the present disclosure and to fully inform the scope of the disclosure to those skilled in the art to which the present disclosure pertains, and the present disclosure is only defined by the scope of the claims.

In addition, in describing the present disclosure, if it is determined that related known technologies may obscure the gist of the present disclosure, a detailed description thereof will be omitted.

Figure 2:
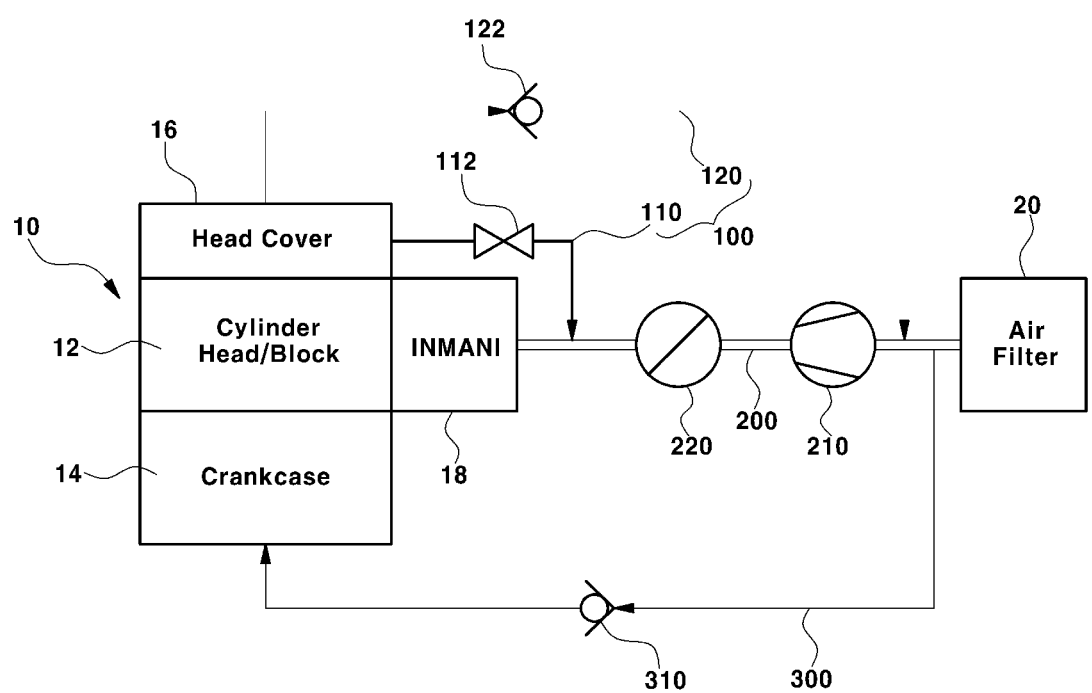
FIG. 2 is a diagram showing a conventional structure of the new air intake system of the engine according to the embodiment of the present disclosure.

FIG. 1 is a diagram schematically showing a new air intake system of an engine according to an embodiment of the present disclosure, and FIG. 2 is a diagram showing a conventional structure of the new air intake system of the engine according to the embodiment of the present disclosure.

As shown in FIG. 1, the new air intake system of the engine according to the present embodiment includes a blow-by gas flow line 100, an intake gas supply line 200, a new air supply line 300, and a new air bypass line 400.

First, the blow-by gas flow line 100 is formed on a head cover 16 to allow blow-by gas introduced into a crankcase 14 to be discharged from a combustion chamber 12 of an engine 10, and the same is provided so that blow-by gas is recirculated by a pressure difference according to load of the engine 10 and flows into an intake manifold 18.

In general, blow-by gas refers to gas discharged from a combustion chamber to a camshaft case or the crankcase 14 through a gap between a cylinder block and a piston between a compression stroke and an expansion stroke during a stroke cycle of a vehicle engine.

When blow-by-gas is accumulated without being discharged to the camshaft case or the crankcase 14, the same raises pressure inside the engine and adversely affects engine sealing. Accordingly, engine oil may rise into the combustion chamber due to an increase in internal pressure, thereby causing unnecessary consumption of the engine oil.

Accordingly, in order to control pressure inside the crankcase 14, it is necessary to prevent an increase in pressure inside the engine by discharging blow-by gas to the outside of the engine. To this end, the blow-by gas flow line 100 includes a partial load line 110 and a full load line 120.

The partial load line 110 connects the head cover 16 to the rear end of the intake gas supply line 200. Further, the partial load line 110 is formed so that blow-by gas discharged from the head cover 16 flows into the intake manifold 18 when the engine 10 is partially loaded.

To this end, the partial load line 110 may include a pressure control valve (PCV) 112 configured to selectively control opening and closing thereof when the engine is partially loaded and a pressure difference between the head cover 16 and the rear end of the intake gas supply line 200 is generated.

In other words, when blow-by gas flows from the combustion chamber 12 to the crankcase 14, the blow-by gas acts as a major cause of air pollution. For this reason, it is necessary to force blow-by gas to flow from the head cover 16 to the intake manifold 18 to burn the same again. Here, a pressure difference occurs between the head cover 16 and the rear end of the intake gas supply line 200, and more specifically, when the engine 10 is partially loaded, the rear end of the intake gas supply line 200 has a lower pressure than that of the head cover 16. In this case, the PCV valve 112 may be opened to allow blow-by gas to be reburned to flow into the intake manifold 18.

Here, in the case of the full load line 120 formed to connect the head cover 16 to the front end of the intake gas supply line 200 and configured to allow blow-by gas selectively discharged from the head cover 16 to flow into a turbocharger 210, since the intake manifold 18 acts as negative pressure, the full load line 120 has relatively higher pressure than that of the partial load line 110 on the PCV valve 112 side, and as such, blow-by gas stops flowing due to a pressure difference between the full load line 120 and the partial load line 110.

Conversely, when the engine 10 is boosted, that is, when the engine 10 is fully loaded, a throttle valve 220 is opened to allow intake gas compressed through the turbocharger 210 to flow through the intake gas supply line 200, and the pressure on the intake manifold 18 side is relatively higher than that on the PCV valve 112 side. Accordingly, blow-by gas does not flow through the partial load line 110 due to a pressure difference between the intake manifold 18 side and the PCV valve 112 side, but flows through the full load line 120. More specifically, since blow-by gas may not flow through the partial load line 110 and a new air supply line 300 to be described later due to the pressure difference therebetween and a check valve 310. Accordingly, blow-by gas flows through the full load line 120 and a check valve 122 is opened, and as such, blow-by gas is recirculated toward the front end of the intake gas supply line 200.

Meanwhile, the new air intake system of the present disclosure includes the new air supply line 300 branched from the intake gas supply line 200 and connected to the crankcase 14. Here, the new air supply line 300 is provided to allow new air, configured to pass through an air filter 20 and supplied toward the intake gas supply line 200, to selectively flow into the crankcase 14.

The new air supply line 300 includes the check valve 310 that enables new air to flow in one direction. Further, when the engine 10 is partially loaded, the check valve 310 is opened to allow the new air supplied through the air filter 20 to be introduced into the crankcase 14.

That is, when the engine 10 is partially loaded, the front end of the intake gas supply line 200 is at atmospheric pressure and the crankcase 14 is in the negative pressure state. Accordingly, the new air supplied through the air filter 20 may be introduced into the crankcase 14 through the new air supply line 300.

However, in the related art, when the engine 10 is fully loaded, as shown in FIG. 2, air is compressed along the intake gas supply line 200 through a compressor (not shown) of the turbocharger 210, and the compressed air is supplied to the intake manifold 18 side. Here, pressure at the front end of the intake gas supply line 200 is lowered, thereby significantly reducing the amount of new air introduced into the new air supply line 300.

Accordingly, since the amount of new air introduced into the crankcase 14 is reduced, a problem such as oil deterioration occurs, and as a result, durability of the engine deteriorates.

To this end, in this embodiment, a new air bypass line 400 is provided to enable air to flow into the crankcase 14 when the engine 10 is fully loaded.

Here, the new air bypass line 400 is bypassed at the rear end of the intake gas supply line 200 and connected to the new air supply line 300. When the engine 10 is fully loaded and the throttle valve 220 is opened, a part of high-pressure intake gas including new air is selectively bypassed by a pressure difference and the new air bypass line 400 allows the part of high-pressure intake gas to flow into the crankcase 14.

In other words, when the engine 10 is fully loaded, air is compressed through a compressor (not shown) and supplied to the intake manifold 18. Here, in the same manner as in the related art, pressure at the front end of the intake gas supply line 200 is lowered and air does not flow into the new air supply line 300 (refer to FIG. 2). However, since air at the rear end of the intake gas supply line 200 is in the compressed high-pressure state, air may flow into the new air bypass line 400 by a pressure difference, thereby enabling the air to be introduced into the crankcase 14.

Preferably, the new air bypass line 400 may be connected to the front end of the check valve 310 to prevent new air supplied to the front end of the intake gas supply line 200 from flowing backward in the new air supply line 300. In other words, the new air bypass line 400 may be connected to the front end of the check valve 310 to enable new air to flow in one direction toward the crankcase 14 in the new air supply line 300.

In addition, the new air bypass line 400 may be provided with a flow rate control valve 410, and the flow rate control valve 410 may have the same structure as the PCV valve 112 provided on the partial load line 110.

That is, as described above, the flow rate control valve 410 is provided to selectively control opening and closing thereof when the engine 10 is fully loaded and a pressure difference between the rear end of the intake gas supply line 200 and the crankcase 14 is generated. For example, when a large amount of new air flows into the crankcase 14, pressure of the crankcase 14 rises and changes from negative pressure to positive pressure, that is, new air may not flow thereinto due to the pressure difference. In this case, the flow rate control valve 410 is provided to adjust the flow rate for new air.

According to the embodiment, the new air bypass line 400 enables new air to be introduced into the crankcase 14 when the engine 10 is fully loaded or partially loaded, thereby making it possible not only to prevent deterioration of the engine but also to reduce consequent generation of oil sludge. In this manner, durability of the engine may be improved.

As is apparent from the above description, the present disclosure provides a new air intake system of an engine configured to, when an engine is boosted, open a throttle valve, operate a compressor of a turbocharger, and supply compressed intake gas including new air and blow-by gas to an intake manifold. Here, the new air intake system includes a bypass flow path configured to connect the rear end of an intake gas supply line to a crankcase. Further, when the engine is fully loaded, the bypass flow path bypasses intake air and allows the intake air to be selectively introduced into the crankcase, thereby making it possible not only to prevent deterioration of the engine but also to reduce consequent generation of oil sludge. In this manner, durability of the engine may be improved.

The disclosure has been described in detail with reference to preferred embodiments shown in the accompanying drawings. However, it will be appreciated by those skilled in the art that those preferred embodiments are only illustrative, and all or part of the embodiments may be selectively combined and configured to make various modifications thereto. Consequently, the true technical protective scope of the present disclosure should be determined based on the technical spirit of the appended claims.

What is claimed is:

1. An air intake system for an engine, comprising:
a blow-by gas flow line configured to be formed on a head cover of an engine to allow blow-by gas introduced into a crankcase of the engine to be discharged from a combustion chamber of the engine, the blow-by gas flow line being configured to allow the blow-by gas to flow into an intake manifold of the engine by recirculating the blow-by gas by utilizing a pressure difference generated if the engine is loaded;
an intake gas supply line configured to received compressed intake gas from a turbocharger and to supply the compressed intake gas into the combustion chamber and to allow the intake gas to flow therethrough, the intake gas supply line comprising a throttle valve configured to control an intake amount of the intake gas to be supplied to the combustion chamber;

a new air supply line branched from the intake gas supply line and being connected to the crankcase, the new air supply line being configured to provide new air to pass through an air filter and be supplied to the intake gas supply line and to selectively flow into the crankcase; and a new air bypass line bypassed on the intake gas supply line and being connected to the new air supply line, wherein, if the engine is loaded and the throttle valve is opened, a portion of the compressed intake gas comprising the new air is selectively bypassed due to the pressure difference, and wherein the new air bypass line is configured to allow the portion of the compressed intake gas to flow into the crankcase.

2. The air intake system of claim 1, wherein the blow-by gas flow line comprises:

a partial load line configured to connect the head cover to a rear end of the intake gas supply line, the partial load line being formed to allow blow-by gas discharged from the head cover to flow into the intake manifold if the engine is partially loaded; and a full load line configured to connect the head cover to a front end of the intake gas supply line, the full load line being formed to allow blow-by gas discharged from the head cover to flow into the turbocharger if the engine is fully loaded.

3. The air intake system of claim 2, wherein the partial load line comprises a pressure control valve (PCV) configured to selectively control opening and closing thereof if the engine is partially loaded and a pressure difference between the head cover and the rear end of the intake gas supply line is generated.

4. The air intake system of claim 1, wherein the new air bypass line comprises a flow rate control valve configured to selectively control opening and closing thereof if the engine is fully loaded and a pressure difference between a rear end of the intake gas supply line and the crankcase is generated.

5. The air intake system of claim 1, wherein the new air bypass line is connected to a front end of a check valve configured to allow the new air to flow in one direction in the new air supply line.

6. The air intake system of claim 1, further comprising the engine.

7. The air intake system of claim 1, further comprising the turbocharger.

\* \* \* \* \*